United States Patent [19]
Woodward, Jr.

[11] Patent Number: 5,777,421
[45] Date of Patent: Jul. 7, 1998

[54] DISC-TYPE ELECTRICAL MACHINE

[76] Inventor: Richard C. Woodward, Jr. 1119 N. Oakdale, Fullerton, Calif. 92831

[21] Appl. No.: 803,864

[22] Filed: Feb. 24, 1997

Related U.S. Application Data

[63] Continuation-in-part of Ser. No. 279,013, Jul. 22, 1994, abandoned.

[51] Int. Cl.$^6$ ........................................... H02K 1/06
[52] U.S. Cl. ........................................... 310/268; 310/216
[58] Field of Search ........................... 310/42, 67 R, 310/190, 192, 209, 261, 262, 268, 216, 217, 259

[56] References Cited

U.S. PATENT DOCUMENTS

| | | | |
|---|---|---|---|
| 2,677,256 | 5/1954 | Donandt | 310/209 X |
| 3,296,475 | 1/1967 | Parker | 310/268 |
| 3,304,450 | 2/1967 | Bosco, Jr. et al. | 310/126 |
| 3,312,842 | 4/1967 | Heuchling et al. | 310/17 |
| 3,581,389 | 6/1971 | Mori et al. | 29/598 |
| 4,080,542 | 3/1978 | De Graffenried | 310/159 |
| 4,207,487 | 6/1980 | Beyersdorf | 310/268 |
| 4,318,038 | 3/1982 | Munehiro | 318/135 |
| 5,093,596 | 3/1992 | Hammer | 310/191 |
| 5,177,392 | 1/1993 | Scott | 310/268 |

Primary Examiner—Steven L. Stephan
Assistant Examiner—Judson H Jones
Attorney, Agent, or Firm—Cleveland R. Williams, III

[57] ABSTRACT

The present invention resides in an improved disc-type, electrical machine having enhanced efficiency and effectiveness. The disc-type, electrical machine comprises a housing unit, a stator connected to said housing unit, a shaft rotatably connected to the stator or housing unit with rotation means, a rotor connected to the shaft wherein the stator surface area and the rotor surface area which are juxtaposed to each other are serrated, thus producing increased magnetic flux areas. The larger surface areas improves heat transfer from the unit's interior and lowers the magnetic flux density between the stator and rotor.

8 Claims, 2 Drawing Sheets

DISC-TYPE ELECTRICAL MACHINE

This application is a continuation-in-part of patent application Ser. No. 08/279,013, filed Jul. 22, 1994 now abandoned.

BACKGROUND OF THE INVENTION

1. Field of the Invention

This invention resides in an improved disc-type electrical machine having increased efficiency and reduction in energy loss, for example electricity. The machine has increased surface area with surfaces not perpendicular to or in line with the axis of machine. The machine has a reduced air gap loss with the increased surface area of the portion of said rotor and stator which faces each other. It should be noted that the disc-type electrical machines herein can contain one, two or a plurality of rotors and stators. This improved disc-type electrical machine when having an air gap defined by serrated surface areas on the rotor and stator, has reduced magnetic pull on the bearings because of the different angles on the stator and rotor surfaces.

In induction type machines, the power output of said machines depends upon a produced magnetic flux that crosses an air gap between a rotor and stator contained in said machine.

In a disc-type electric motor, torque produced by said machine is directly proportional to the power transferred by a rotating flux or fluxes produced between rotor(s) and stator(s) contained in said motor and having an air gap(s) there between. If the air gap or the air gap flux density between the surface areas of the rotors and stators are too large, a large loss in ampere turns is noted because of the increased energy required to transfer a rotating flux across the air gap between the rotor and stator.

In the past, others have tried to solve the energy loss across the air gap in disc-type machines by increasing the rotor and stator outside diameters, and by increasing the length of the rotor and stator sections for cylindrical air gap machines. These two approaches have the disadvantages of requiring a larger machine.

2. Description of the Prior Art

Numerous attempts have been made in the past to increase the efficiency and reduce the energy consumption of disc-type electric machines in the past.

For example, U.S. Pat. No. 3,296,475 to Parker relates to dynamo-electric machines, and rotors therefor. In particular, the patent describes an axial air gap machine having a lower rotor resistance thereby reducing power losses in said machine.

U.S. Pat. No. 3,304,450 to Bask, Jr., et al. describes an axial airgap dynamo-electric machine, wherein said machine is brushless and contains a rotor spaced apart from a stator armature by an axial air gap. A rotor disc, as described above, has at least one of its sides juxtaposed to a stator core provided with an armature winding with a narrow axial air gap between the faces of the stator and of the rotor.

U.S. Pat. No. 3,581,389 to Mori, et al. discloses a method for producing a magnetic core for an electric rotating machine which has an axially spaced air gap as in the case of a disc-type rotating machine. U.S. Pat. No. 4,207,487 to Beyersdorf describes a disc-type, dynamo-electric machine having two stators and one rotor, active air gaps between each stator and the rotor, two annular energizing windings in the stators, and two non-active or auxiliary air gaps formed in a smooth region between the stators and the rotor.

U.S. Pat. No. 5,093,596 to Hammer relates to a combined linear-rotary direct drive step motor which provides both linear and rotary motion over a predefined range, e.g. along a portion of the longitudinal axis of the rotor shaft. The rotor and stator of the rotary step motor are described as having teeth.

U.S. Pat. No. 5,177,392 to Scott discloses a disc-type machine having a plurality of alternating stator and/or rotor sections. The stator has micro-laminated stator teeth molded from cut steel particles, mounted on a large disc of composite fiber material which is the main structure component of each stator section.

As can readily be determined from the foregoing there is an ongoing research effort and a need to develop and produce new and novel disc-type electric motors that have increased efficiency, is economical and easy to manufacture.

SUMMARY OF THE INVENTION

The present invention resides in an improved disc-type, electric machine having air gap flux with increased surface area on a rotor and a stator, comprising a motor housing containing, a stator section attached to the stator or housing, a shaft rotatably attached to the housing with rotation means, a rotor section attached to the shaft, wherein said stator and rotor contain a small axial air gap therebetween, and a face area of each stator and rotor containing serrations thereon, each of said rotor face and stator face being juxtaposed to and facing each other.

DETAILED DESCRIPTION OF THE INVENTION

Figure 1:
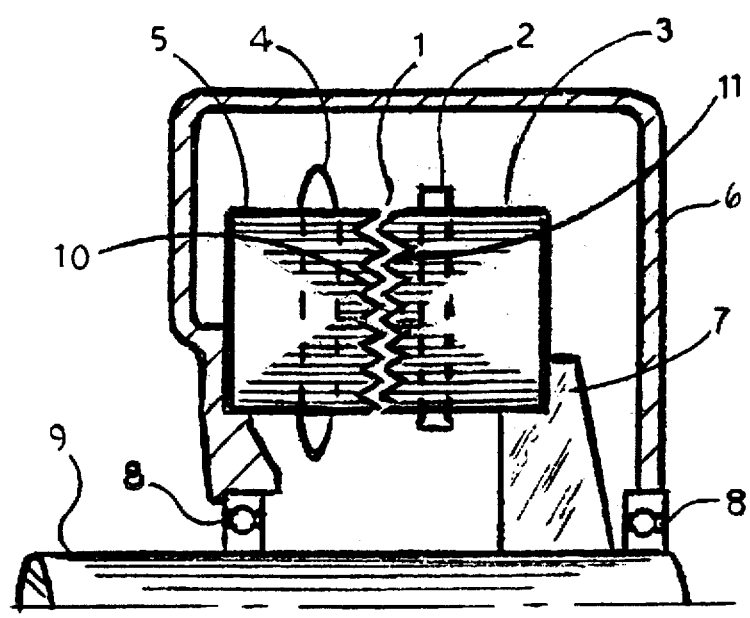
FIG. 1 is a cross-sectional partial, frontal view of a disc-type electric motor containing a motor housing, shaft, and stator and rotor sections containing serrated face areas.

This invention relates to a disc-type electric machine having increased efficiency. The disc-type electric machine comprises a housing, one or more stators connectably attached to the housing, a shaft rotatably attached to the housing with rotation means, and one or more rotors connectably attached to the shaft.

The surfaces of the stator and rotor which face and are juxtaposed to each other have serrated surface areas. This serrated surface area of the stator and rotor increases the surface area up to two hundred percent (200%) without increasing the pole material or size of said rotor or stator.

Another benefit of having serrated surfaces of the rotor and stator, resides in the fact that the axial air gap surfaces thereof are no longer parallel to the unit axis, which results in a net reduction of magnetic side pull in the unit.

The increased surface area of the rotor and stator, provided that the axial air gap is not somehow increased, results in a reduction of the axial air gap flux density. This reduction influx density reduces the amount of magnetizing electrical current drawn from a power source, for example, an electrical power line.

The amount of current lost or wasted in inefficient disc-type electric motors may be from eighteen percent (18%) to forty percent (40%) of the rated current in induction motors. The largest portion of the lost or wasted current, up to seventy-five percent (75%) is caused by the magnetic flux across the axial air gap between the stator and rotor. A process for solving this problem involves either reducing the distance across the axial air gap between the stator and rotor, or reducing the magnetic gap flux density between said stator and rotor. By reducing the magnetic gap flux density between the stator and rotor, the amount of electrical current needed to produce the magnetizing current in the machine is reduced, thus providing for a more efficient machine. There is a direct link between the disc-type electrical motor's magnetizing current and the number of turns in the stator coil, wherein the magnetizing current times the number of turns in the stator coil is directly proportional to the length (axial air gap) between the air gap surfaces of the stator and rotor times the air gap flux density.

Modifying any of the above parameters will have an effect upon the amount of electrical current needed to operate a disc-type electric motor.

The substantially increased surface area produced by serrating the juxtaposed surface areas of the stator and rotor herein substantially reduces the axial, air-gap flux density of my disc-type electrical motor thus providing for a more efficient and effective motor. Another benefit derived from using the serrated surface areas herein includes the increased transfer of heat from the interior of the motor to the outside of said motor due to the increased surface areas of the stator or rotor.

The invention is further described by reference to the appended drawing taken in conjunction with the following description where:

FIG. 1 shows an improved disc-type electrical motor containing housing unit 6. Attached to housing unit 6 is stator core 5 which consists of rolled, sheet-steel ribbon. Stator coil end turns 4 are contained in slots within stator unit 5 as depicted. Shaft 9 is rotatably attached to housing unit 6 by rotation means 8 consisting of two separate ball bearing units. The relationship of the air gap 1 distance between the serrated surface areas (10 and 11 respectively) of stator section 5 and rotor section 3 has a profound effect on the efficiency of the electric disc-type machines herein. The serrated surface areas 10 and 11) of stator section 5 and rotor section 3 define axial air gap 1. It is to be noted that the bearing units of rotation means 8 can typically include tapered roller bearings, sleeve bearings, etc. as well as ball bearings. It is additionally highly desirable for rotation means 8 to have a nonmagnetic barrier to reduce the loss of magnetic flux through said rotation means 8.

Figure 2:
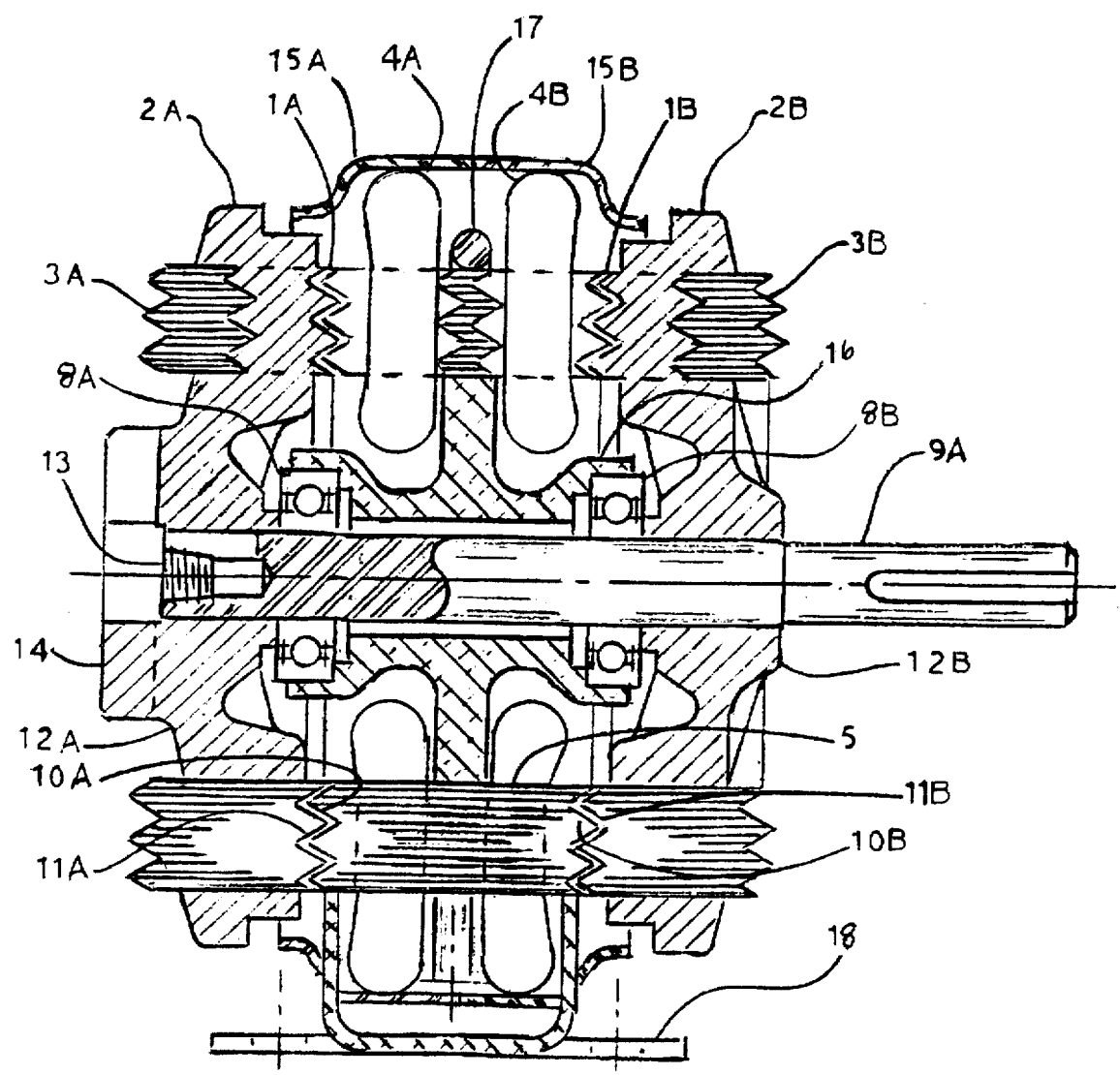
FIG. 2 is a cross-sectional assembly drawing of a disc-type motor with two serrated air gaps, horizontal mountable with integral drive coupling half and standard take-off shaft extension.

FIG. 2 shows an improved disc-type electrical motor containing mounting base 18. U shaped stud pulls 17 pulls stator core assembly 5 and attaches to mounting base 18. Ball bearings support 16 is located in stator core assembly 5 and contains ball bearings 8A and 8B. Ball bearings 8 and 8B are mounted and positioned on shaft 9A.

Rotor core assemblys 3A and 3B are securely mounted and attached to shaft 9 utilizing inner end rings 12A and 12B. Shaft 9A is slit at one end and contains internal threads which permits said shaft 9A to expand using threaded plug 13 to firmly lock rotor core assembly 3A firmly in place. It is to be noted that either threaded plug 13 or the internal threads of shaft 9A are tapered. Inner end ring 12A which is attached to rotor core assembly 3A has projection 14 which forms a jaw type coupling half.

Primary windings 4A and 4B are located in stator slots of stator core assembly 5. Stator covers 15A and 15B cover primary windings 4A and 4B and forms a buffer for foreign material with rotating rotor end rings 2A and 2B. End ring 2A is the outer rotor end ring for rotor core assembly 3A with integral drive coupling half 14. Serrated stator surface area 10A and serrated rotor surface area 11A define air gap 1A. Serrated stator surface area 10B serrated rotor surface area 11B define air gap 1B.

Obviously, many modifications and variations of the invention, as hereinbefore set forth, may be made without departing from the spirit and scope thereof, and therefore, only such limitations should be imposed as are indicated in the appended claims.

I claim:

1. An improved disc-type, electrical machine having an air-gap with increased surface area comprising a housing unit, stator sections attached to the housing unit, a shaft rotatively attached to the housing unit with rotation means, rotor sections attached to the shaft, wherein each stator and rotor sections are separated by an axial air gap and each stator and rotor section have serrated face surface areas which define the axial air gap between the stator and rotor sections.

2. The improved disc-type, electrical machine according to claim 1, wherein said machine contains one stator section and one rotor section.

3. The improved disc-type, electrical machine described in claim 1, wherein said machine contains one or more stator section(s) and one or more rotor section(s).

4. The improved disc-type, electrical machine of claim 3, wherein a portion of the shaft contains a threaded plug for expanding the length of said shaft.

5. The improved disc-type, electrical machine of claim 3, wherein a rotor section is firmly attached to said rotor by expanding said shaft.

6. The improved disc-type, electrical machine according to claim 1, wherein the rotation means for the shaft comprises a pair of bearing units contained in the housing unit.

7. The improved disc-type, electrical machine of claim 1, wherein a coupling unit is an integral part of the rotor.

8. The improved disc-type, electrical machine of claim 1, wherein a coupling half is an integral part of the rotor, wherein said coupling half is adapted to receive a spider.

* * * * *